United States Patent
Shiota et al.

(10) Patent No.: US 7,027,286 B2
(45) Date of Patent: Apr. 11, 2006

(54) METALLIZED FILM CAPACITOR

(75) Inventors: Kohei Shiota, Hyogo (JP); Toshiharu Saito, Toyama (JP); Hiroki Takeoka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/529,551

(22) PCT Filed: Oct. 9, 2003

(86) PCT No.: PCT/JP03/12949

§ 371 (c)(1),
(2), (4) Date: Mar. 29, 2005

(87) PCT Pub. No.: WO2004/034412

PCT Pub. Date: Apr. 22, 2004

(65) Prior Publication Data

US 2006/0050467 A1 Mar. 9, 2006

(30) Foreign Application Priority Data

Oct. 10, 2002 (JP) ............................ 2002-297278

(51) Int. Cl.
*H01G 4/005* (2006.01)

(52) U.S. Cl. .................. 361/303; 361/309; 361/311

(58) Field of Classification Search ............ 361/301.3, 361/305, 306.1, 306.2, 306.3, 309, 311–313, 361/273

See application file for complete search history.

(56) References Cited

U.S. PATENT DOCUMENTS

| | | | |
|---|---|---|---|
| 4,434,452 A * | 2/1984 | Hamabe et al. | 361/304 |
| 5,608,600 A * | 3/1997 | Lavene | 361/303 |
| 5,905,628 A * | 5/1999 | Okuno et al. | 361/303 |
| 6,370,008 B1 | 4/2002 | Vetter | |
| 2004/0232465 A1 * | 11/2004 | Shiota et al. | 257/298 |

FOREIGN PATENT DOCUMENTS

| | | |
|---|---|---|
| JP | 50-8050 | 1/1975 |
| JP | 61-188920 | 8/1986 |
| JP | 64-8721 | 1/1989 |
| JP | 4-225508 | 8/1992 |
| JP | 5-132291 | 5/1993 |
| JP | 8-288171 | 11/1996 |
| JP | 9-199371 | 7/1997 |
| JP | 10-135072 | 5/1998 |
| WO | 99/43011 | 8/1999 |

\* cited by examiner

*Primary Examiner*—Anthony Dinkins
(74) *Attorney, Agent, or Firm*—Wenderoth, Lind & Ponack, L.L.P.

(57) ABSTRACT

A metallized-film capacitor includes a slit (5a) at approx. center of the width (W) of an effective electrode which actually forms a capacitance of a pair of deposited electrodes (110, 210). Divisional electrodes (2a, 2b) exist at a place between the center and insulation margins (4a, 4b), and the electrodes (2a, 2b) are coupled in parallel to each other by fuses (7a, 7b) disposed away from metallized contacts (6a, 6b). Such a structure as placing fuses (7a, 7b) away from the contacts (6a, 6b) allows reducing a current supplied from the contacts (6a, 6b) and running through fuses (7a, 7b), thereby lowering heat generated from fuses (7a, 7b). As a result, a temperature rise in the metallized-film capacitor can be suppressed.

20 Claims, 8 Drawing Sheets

METALLIZED FILM CAPACITOR

TECHNICAL FIELD

The present invention relates to metallized-film capacitors to be used in electronic devices, electric devices, industrial devices and automobiles.

BACKGROUND ART

There are generally two major products in metallized-film capacitors; the one uses metallic foil as its electrodes, and the other one uses metal deposited on dielectric film as its electrodes. The metallized-film capacitor using deposited metal as the electrodes (hereinafter referred to as a deposited electrode), in particular, can be downsized because of its smaller electrodes than those of the other one, i.e. the capacitor using metallic foil as electrodes, and is more reliable with respect to dielectric breakdown because of its self-healing performance proper to the deposited electrode, so that it has been widely used. Meanwhile, the self-healing performance can recover the function of a capacitor when a short occurs at a defective insulation, because an energy produced at the short vaporizes and scatters the deposited electrodes around the defective insulation, thereby insulating the defective insulation. Such metallized-film capacitors are described hereinafter as prior art 1–3 and with reference to FIGS. 11–16.

As shown in those drawings, a first metallized film includes deposited electrode 110, which is formed by depositing metal on a film, on its one surface except at an edge where insulation margin 4a occupies. Deposited electrode 110 has plural divisional electrodes 2a which are divided by non-deposited slit 52a having no deposited metal, and is coupled in parallel to non-divisional electrode 1a via fuse 7a disposed to slit 52a. A second metallized film includes deposited electrode 210 formed on the entire one surface of dielectric film 3b except an edge on the opposite side to insulation margin 4a, which edge is occupied by insulation margin 4b. Deposited electrode 210 is non-divisional electrode 1b discussed above. The foregoing two metallized films are taken up or wound together such that insulation margins 4a, 4b do not overlap with each other, or the two films are laminated alternately, then metallized contacts 6a and 6b are formed on deposited electrodes 110 and 210 respectively forming connecting sections. FIGS. 15, 16A, and 16B show insulation margin 78a.

The self-healing performance previously discussed of the metallized capacitor becomes better as the thickness of deposited electrodes 110 and 210 decreases, and the deposited electrode can be scattered by less energy. Thus as shown in FIG. 15, the thickness of the deposited electrode of effective electrode 2a, which form a capacity defined by width "W", is thinned, while the thickness of deposited electrode 110 at the connecting sections to metallized contacts 6a and 6b is thickened, so that thick-film electrode 11a is formed. This construction is called a heavy edge structure, which has been also widely used. This structure allows heightening a withstanding voltage of a capacitor, so that capacitors can work at a higher voltage environment.

Slit 52a having no metal at all divides the deposited electrode into plural divisional electrodes 2a, and fuse 7a disposed parts of slit 52a couples divisional electrodes 2a to each other in parallel. At the self-healing, this construction blows out fuse 7a around the defective insulation with a short-circuit current, thereby isolating the defective insulation from the electric circuit. In other words, this construction includes a self-maintaining function.

In recent years, the following idea is proposed: as shown in FIGS. 13, 14A, and 14B, slits 52a are prepared in a lattice form, and the deposited electrode is finely subdivided, and they are coupled to each other in parallel with fuses 7a, so that lattice-like divisional electrodes 32a are formed. This construction allows decreasing an area of each one of divisional electrodes 32a, so that a capacity decrement at blowout of fuse 7a becomes smaller. Limitation of fuse shape or an area of each one of divisional electrodes 32a within a certain range allows increasing the insulation-recovering performance of the deposited electrodes. Therefore, the metallized-film capacitor can obtain a high-voltage gradient performance, to be more specific, a withstanding voltage at a thickness of 1 μm of dielectric film is heightened.

For instance, Japanese Patent Unexamined Publication No. H04-225508 discloses the following structure: Use of lattice-like divisional electrodes, of which divisional slits have free-ends rounded, allows obtaining a voltage gradient twice as much as that of a metallized-film capacitor free of divisional electrodes. Another Japanese Patent Unexamined Publication No. H05-132291 discloses the following structure: a metallized-film capacitor having lattice-like divisional electrodes, each of which has a surface area ranging from 10 to 1000 mm$^2$, can achieve a voltage gradient of 130–350 V/μm with a dc (direct current).

However, although the conventional metallized-film capacitor discussed above achieves a self-maintaining function using a fuse function, the fuse generates heat because of a current running during the operation, so that a temperature of the capacitor increases. In other words, in the case of a constant dc kept applying to the capacitor, the heat can be neglected because a current does not run through the capacitor. On the other hand, if a ripple current, charge or discharge current, or surge current runs through the capacitor, the current runs through the fuse, thereby generating heat. Temperature rise in a capacitor will lower a withstanding voltage, so that a long-term reliability is also lowered.

The lattice-like divisional electrodes previously discussed has a number of fuses, which invite a greater temperature rise, and as a result, its withstanding voltage as well as long-term reliability is substantially lowered. This is a crucial problem.

The heavy-edge structure previously discussed has a thin deposited film, so that heat generated by fuse becomes greater. A wider width of the fuse or parallel arrangement of the fuses will reduce the heat; however, those measures lower the self-maintaining function instead. A satisfactory solution is thus still needed.

In the case of using a capacitor for smoothing application in an inverter control circuit, a large ripple current runs through the capacitor while a dc voltage is applied across the capacitor. In this case, the withstanding voltage of this capacitor is lowered by temperature rise due to the ripple current. When this capacitor is used in an automobile among others, this problem becomes crucial because the environmental temperature is basically high.

DISCLOSURE OF THE INVENTION

The present invention addresses the problems discussed above, and aims to provide a metallized-film capacitor, in which less heat is generated by fuses during the operation, so that a temperature hike in the capacitor is suppressed, and a withstanding voltage is heightened.

The metallized-film capacitor of the present invention includes a self-maintaining function, and comprises a pair of deposited electrodes. One of the paired electrodes nearer to an insulation margin is formed of divisional electrodes coupled to each other by fuses.

This structure allows a current running through a first deposited electrode to decrease as it approaches to the insulation margin, so that the current running through the fuse can be reduced, thereby decreasing the heat generated. Further, the other side of the insulation margin has a second deposited electrode of which electrode is divided and has fuse, so that even if a short occurs at any place of effective electrodes, the fuse is blown-out and then isolated from the electric circuit, i.e., a self-maintaining function is obtainable.

In the case of dividing lattice-like effective electrodes of the deposited electrode approaching to the insulation margin, the heat generated can be more substantially reduced comparing with the prior art which divides a deposited electrode in a lattice form uniformly.

In the case of dividing the deposited electrode having the heavy-edge structure and approaching to the insulating margin, the heat generated can be also substantially reduced.

DETAILED DESCRIPTION OF PREFERRED EMBODIMENTS

The metallized-film capacitor of the present invention is demonstrated hereinafter in the following exemplary embodiments.

EXEMPLARY EMBODIMENT 1

Figure 1:
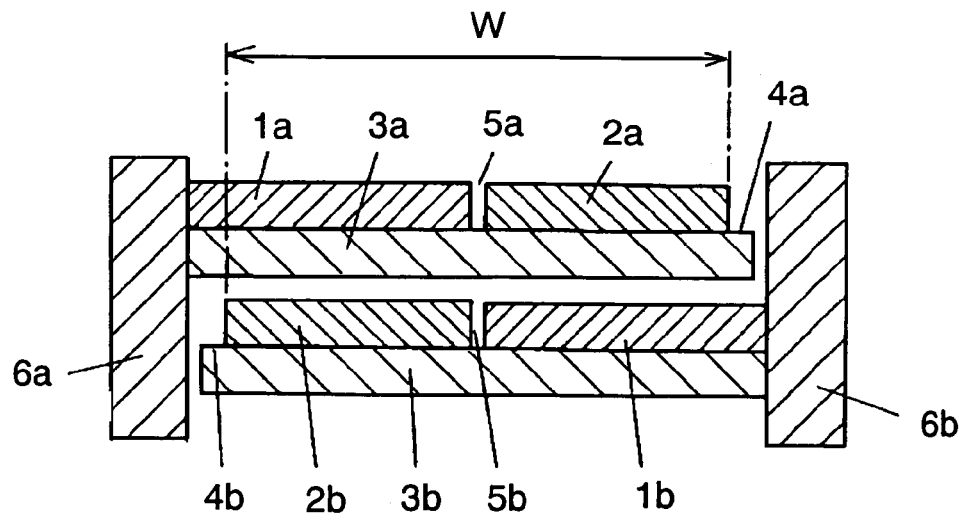
FIG. 1 shows a sectional view of a metallized-film capacitor in accordance with a first exemplary embodiment of the present invention.
Figure 2A:
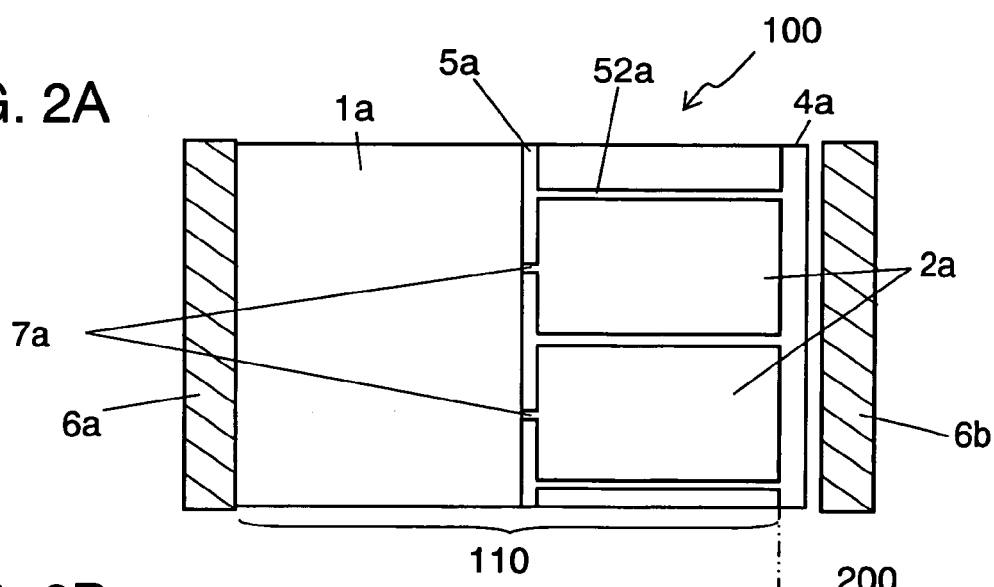
FIG. 2A shows a plan view of a first metallized-film in accordance with the first exemplary embodiment of the present invention.
Figure 2B:
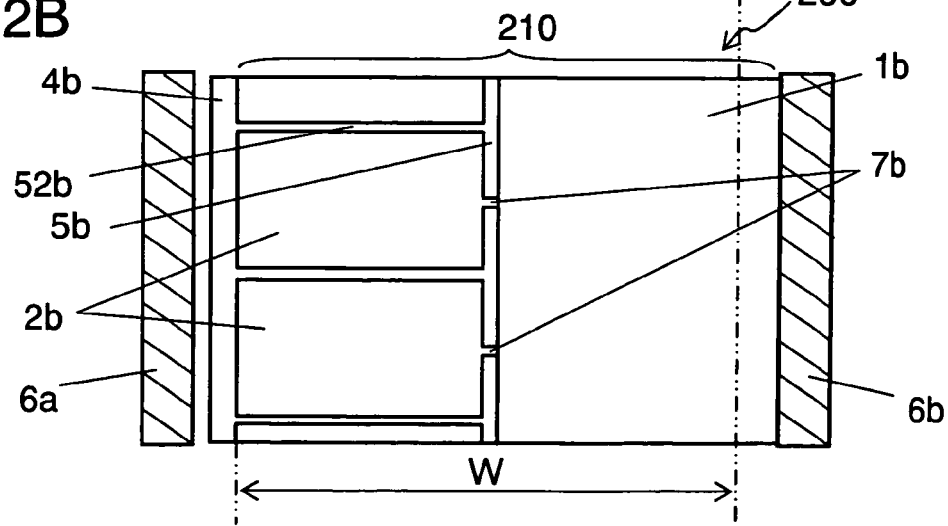
FIG. 2B shows a plan view of a second metallized-film in accordance with the first exemplary embodiment of the present invention.

FIG. 1, FIGS. 2A and 2B show first metallized-film 100 and second metallized-film 200, which are elements of a winding-type metallized-film capacitor. Those films include a pair of deposited electrodes 110 and 210 formed by depositing aluminum in a pattern on respective one face of dielectric films 3a and 3b, and insulation margin 4a, 4b occupying respective one edge of dielectric films 3a, 3b. Electrodes are led out from the pair of deposited electrodes 110 and 210 through metallized contacts 6a, 6b disposed respectively on either one of the end-faces.

Deposited electrodes 110, 210 have non-deposited slits 5a, 5b respectively at approx. center of the width (W) of an effective electrode forming a capacitance. Slits 5a, 5b do not have deposited electrodes and are formed by transferring patterned oil onto the dielectric film before the deposition. As FIGS. 2A, 2B show, deposited electrodes 110, 210 include plural divisional electrodes 2a, 2b between insulation margins 4a, 4b and slits 5a, 5b. Deposited electrodes 110 and 210 also include non-divisional electrodes 1a, 1b between slits 5a, 5b and metallized contacts 6a, 6b. Divisional electrodes 2a and 2b are divided by slits 52a and 52b. Each one of divisional electrodes 2a is coupled in parallel to non-divisional electrode 1a by fuse 7a, and each one of divisional electrodes 2b is coupled in parallel to non-divisional electrode 1b by fuse 7b.

As shown in FIG. 1, non-divisional electrode 1a and divisional electrode 2a both included in deposited electrodes 110 have substantially the same thickness, and non-divisional electrode 1b and divisional electrode 2ba both included in deposited electrodes 210 have substantially the same thickness.

The structure discussed above achieves a metallized-film capacitor having a self-maintaining function, producing less heat from fuses 7a, 7b. In other words, the current running through deposited electrodes 110, 210 increases at smaller distances from metallized contacts 6a, 6b, and decreases at greater distances therefrom. Accordingly, deposited electrodes 110, 210 near to metallized contacts 6a, 6b are formed free of divisions on the entire one face of dielectric films 3a, 3b in order to deal with an amount of the current running. On the other hand, divisional electrodes 2a, 2b and fuses 7a, 7b are disposed at the places away from contacts 6a, 6b and a small amount of current runs through. As a result, the current running produces less heat at fuses 7a, 7b, thereby suppressing a temperature rise.

EXEMPLARY EMBODIMENT 2

The second embodiment differs from the first one in having lattice-like divisional deposited electrodes at the respective places between the approx. center of the width of effective electrode and the insulation margin. Similar elements to those in the first embodiment have the same reference marks, and only the different points between the second embodiment and the first one are demonstrated hereinafter.

Figure 3:
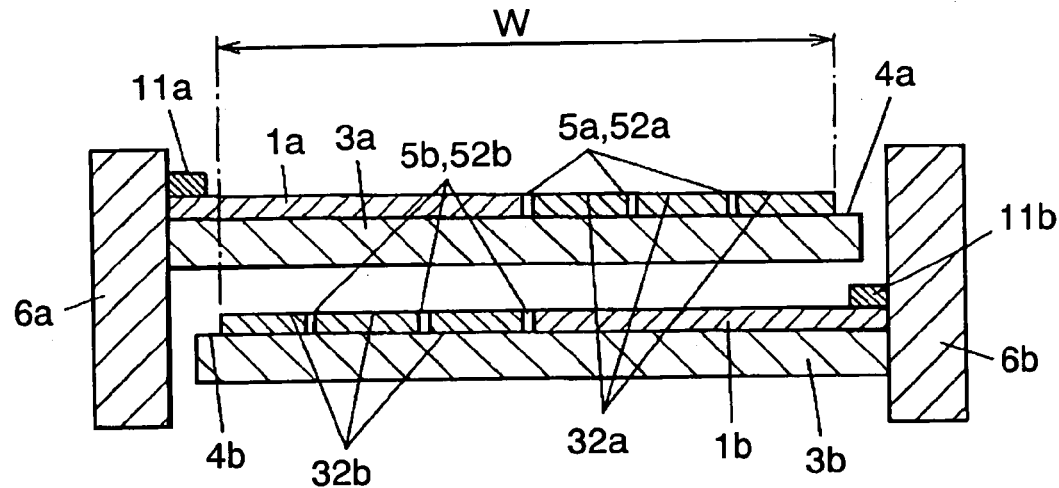
FIG. 3 shows a sectional view of a metallized-film capacitor in accordance with a second exemplary embodiment of the present invention.
Figure 4A:
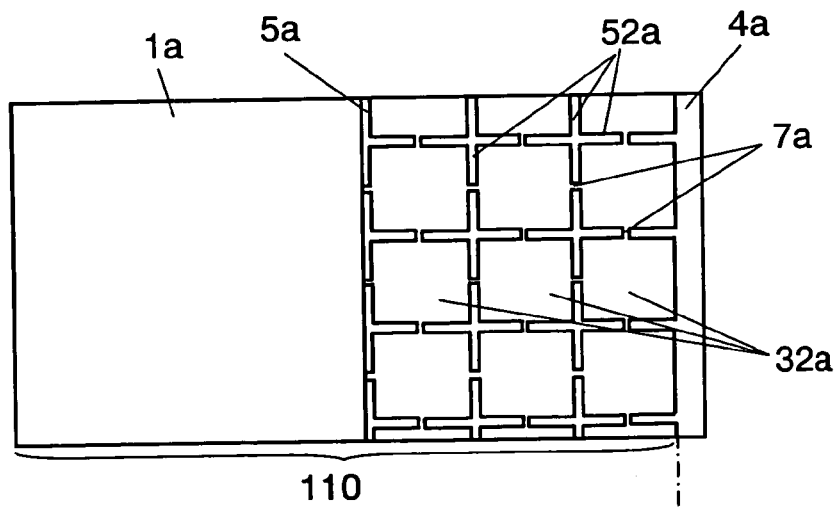
FIG. 4A shows a plan view of a first metallized-film in accordance with the second exemplary embodiment of the present invention.
Figure 4B:
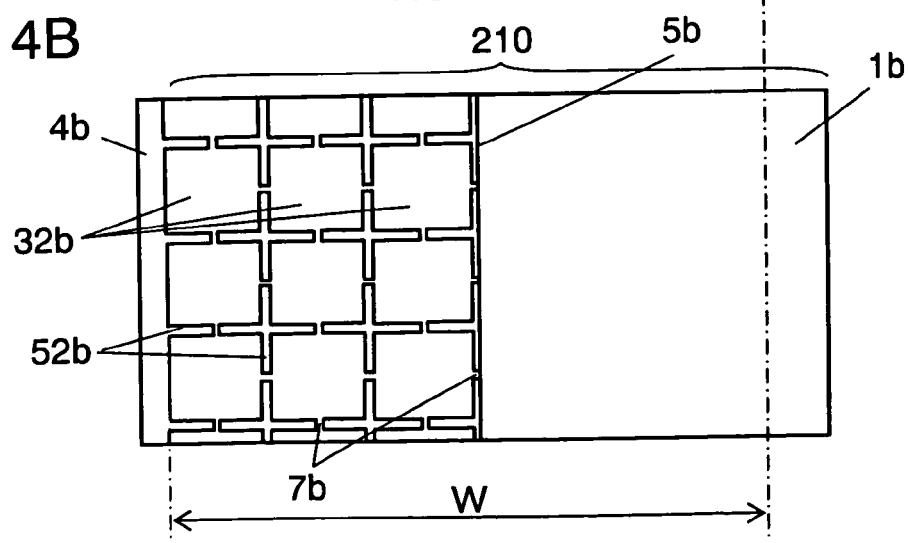
FIG. 4B shows a plan view of a second metallized-film in accordance with the second exemplary embodiment of the present invention.

As shown in FIG. 3, FIGS. 4A and 4B, deposited electrodes 110, 210 of the metallized-film capacitor in accordance with the second embodiment include slits 5a, 5b at approx. center of the width (W) of respective effective electrodes which form the capacitance. Electrodes 110, 210 also include slits 52a and 52b, having no deposited electrodes, at the places between the center and insulation margins 4a and 4b. Plural lattice-like divisional electrodes 32a, 32b are divided by slits 52a, 52b, and coupled in parallel respectively to each other by fuses 7a, 7b. On the other hand, non-divisional electrodes 1a, 1b exist in the place between the slits 5a, 5b at the center and metallized contacts 6a, 6b. As shown in FIG. 3, deposited electrodes 110, 210 are thinner at the effective electrode area, and have thick-film electrodes 11a, 11b at the place connected to metallized contacts 6a, 6b, namely, electrodes 110, 210 are in a heavy-edge structure.

This construction achieves a metallized-film capacitor having a self-maintaining function, producing less heat from fuses 7a, 7b due to the effects described in the first embodiment. Further, the present invention allows the capacitor to work in a higher voltage environment.

EXEMPLARY EMBODIMENT 3

The third embodiment differs from the first one in preparing a pair of deposited electrodes on both faces of a first dielectric film and no metal deposited at all on a second dielectric film. Similar elements to those in the first embodiment have the same reference marks, and only the different points between the third embodiment and the first one are demonstrated hereinafter.

Figure 5:
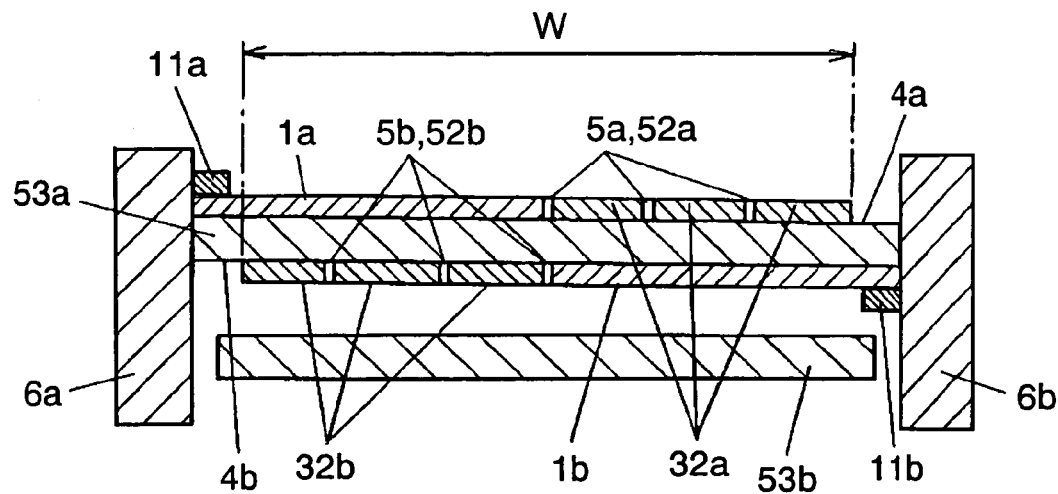
FIG. 5 shows a sectional view of a metallized-film capacitor in accordance with a third exemplary embodiment of the present invention.
Figure 6A:
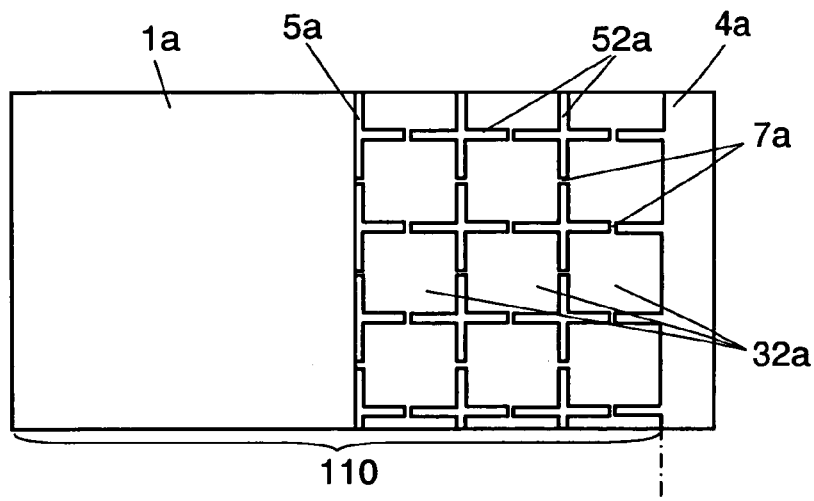
FIG. 6A shows a plan view of a first face of a metallized-film in accordance with the third exemplary embodiment of the present invention.
Figure 6B:
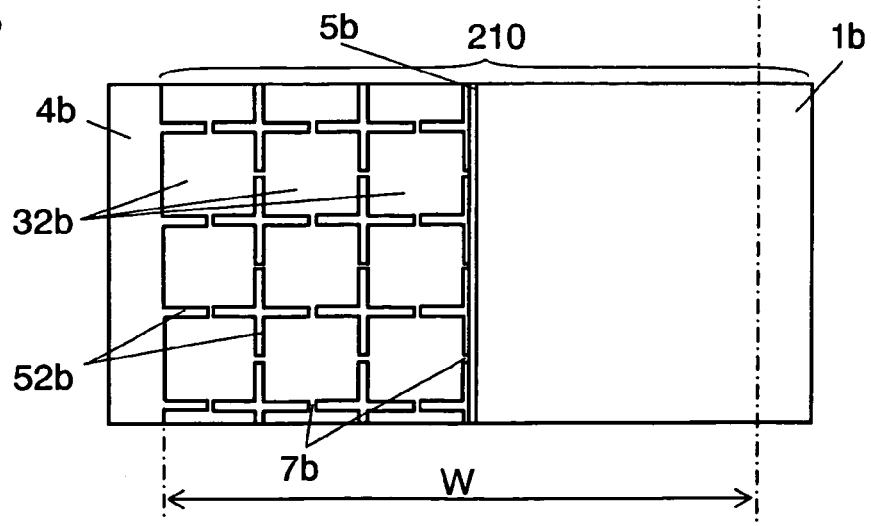
FIG. 6B shows a plan view of a second face of the metallized-film in accordance with the third exemplary embodiment of the present invention.

As shown in FIG. 5, FIGS. 6A and 6B, a metallized-film capacitor in accordance with the third embodiment includes dielectric film 53a having deposited electrodes 110, 210 formed on its both the faces, and dielectric film 53b having no deposition. Both of films 53a and 53b overlap each other, and electrodes 110, 210 are coupled respectively to metallized contacts 6a, 6b formed respectively on either one of the end faces. Electrodes 110, 210 include slits 5a, 5b at approx. center of the width (W) of the effective electrodes which form the respective capacitance, and are divided by slits 52a, 52b having no deposited electrodes into plural lattice-like divisional electrodes 32a, 32b at the place between the center and insulation margins 4a, 4b. The lattice-like electrodes are coupled to each other in parallel by fuses 7a, 7b. On the other hand, non-divisional electrodes 1a, 1b exist at the place between the center and contacts 6a, 6b. As shown in FIG. 5, deposited electrodes 110, 210 are in the heavy-edge structure having thick-film electrodes 11a, 11b.

The structure discussed above allows obtaining an advantage and an effect similar to what are described in the first embodiment, and also allows forming deposited electrodes 110, 210 by only one depositing step, so that a metallized-film capacitor is obtainable at a less expensive cost.

Properties Evaluation 1

The properties of the metallized-film capacitors in accordance with the first–third exemplary embodiments are evaluated hereinafter.

The metallized-film capacitors in accordance with the first–third embodiments are formed this way: polypropylene film of 4 µm thickness is wound up as dielectric film into an oval shaped capacitor element, and this element is housed by a container made from PPS (polyphenylene sulfide) before the container is molded by epoxy resin. The oval-shaped capacitor has the capacitance of 120 µF. The effective electrode has a width (W) of 80 mm, and fuses 7a, 7b have a width of 0.4 mm. Conventional metal-film capacitors are produced as prior art 1 and prior art 2 for comparison. Those conventional ones use same dielectric material and same dimensions: film thickness, capacitance, width (W) and width of fuses, as those discussed in the first–third embodiments.

Prior Art 1

Figure 11:
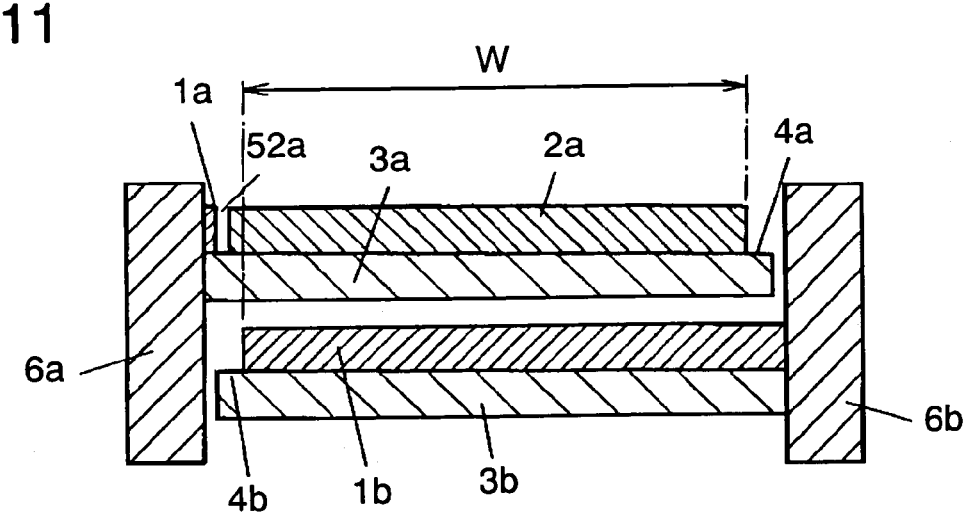
FIG. 11 shows a sectional view of a metallized-film capacitor in accordance with prior art 1.
Figure 12A:
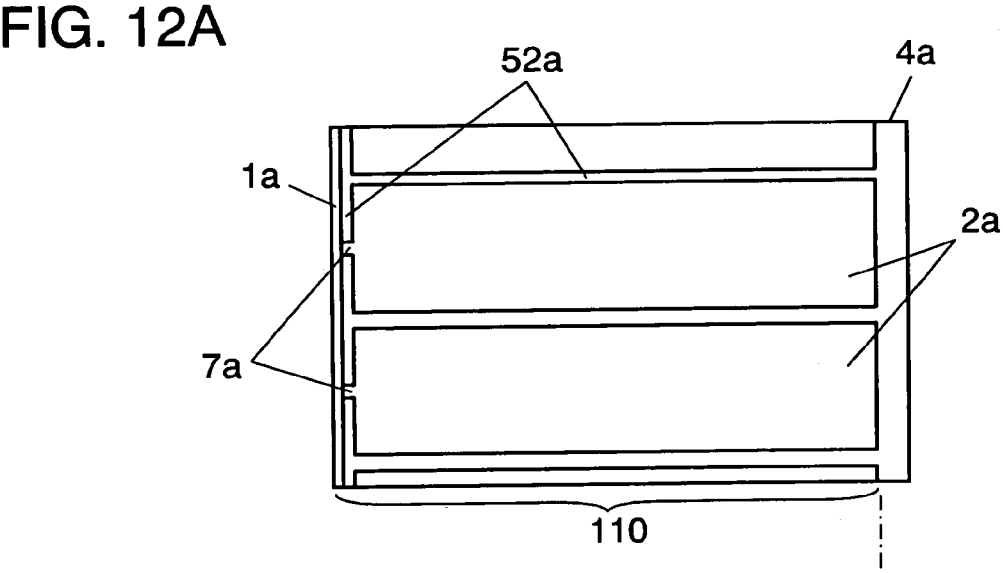
FIG. 12A shows a plan view of a first metallized-film in accordance with the prior art 1.
Figure 12B:
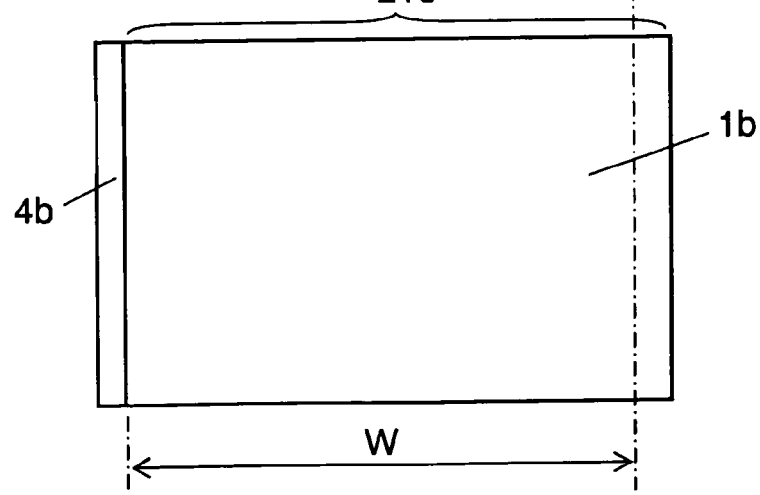
FIG. 12B shows a plan view of a second metallized-film in accordance with the prior art 1.

As shown in FIG. 11, FIGS. 12A and 12B, divisional electrodes 2a are provided across the width (W) of the effective electrode on dielectric film 3a, and deposited electrode 1b free of division is provided on dielectric film 3b, so that the metallized-film capacitor is formed.

Prior Art 2

Figure 13:
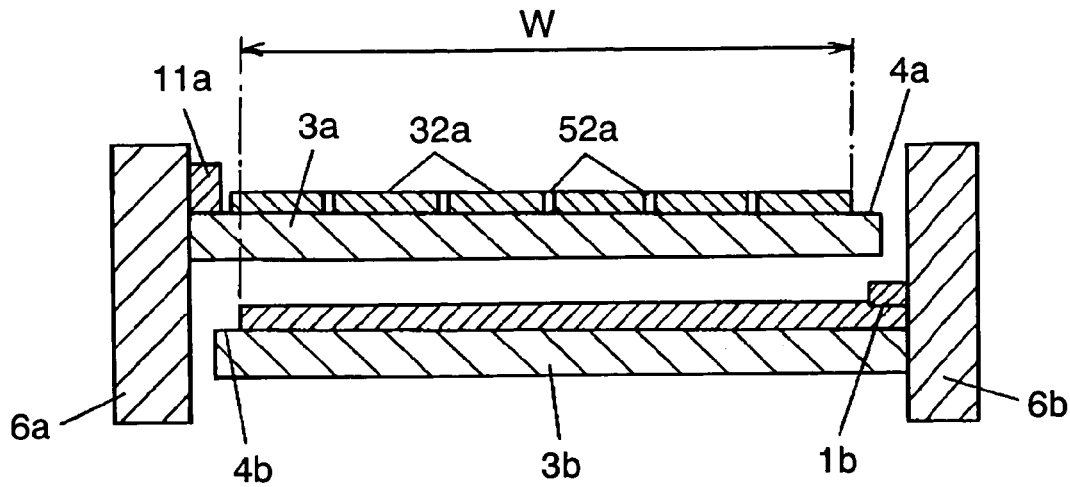
FIG. 13 shows a sectional view of a metallized-film capacitor in accordance with prior art 2.
Figure 14A:
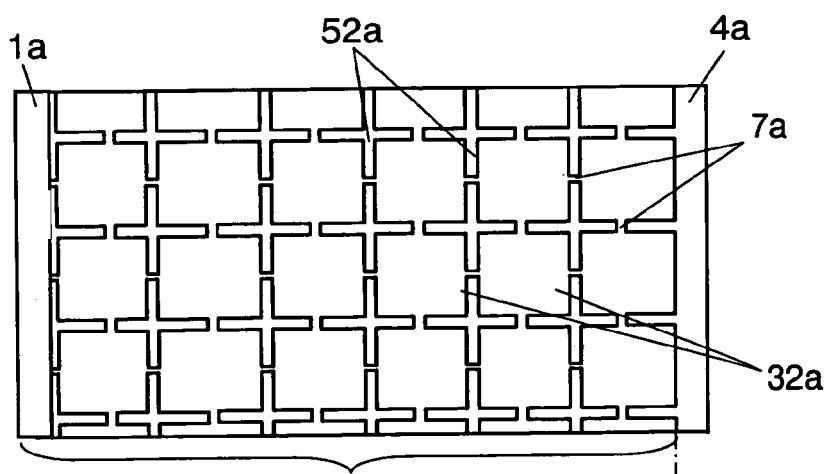
FIG. 14A shows a plan view of a first metallized-film in accordance with the prior art 2.
Figure 14B:
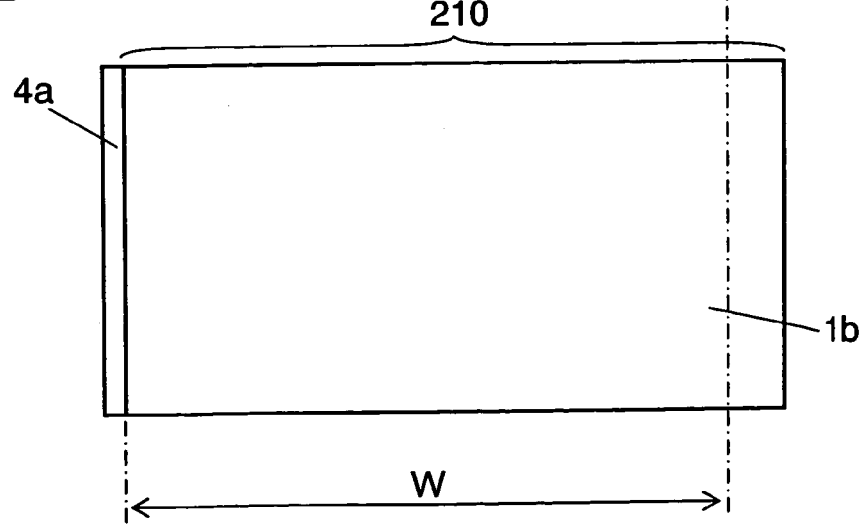
FIG. 14B shows a plan view of a second metallized-film in accordance with the prior art 2.

As shown in FIG. 13, FIGS. 14A and 14B, lattice-like divisional electrodes 32a are provided across the width (W) of the effective electrode on dielectric film 3a, and deposited electrode 1b free of division is provided on dielectric film 3b, so that the metallized-film capacitor is formed.

A sine-wave effective current of 20 A runs through those capacitors thus produced for 180 minutes at 10 kHz and 85° C. Then measure a temperature rise on the surface of the oval-shaped capacitor elements. In 180 minutes of current running, the temperature rise is saturated in each of the capacitors. Table 1 shows the result.

TABLE 1

| | Temperature Rise (° C.) | Capacitance Change (%) |
| --- | --- | --- |
| Embodiment 1 | 6.3 | −7.9 |
| Embodiment 2 | 12.8 | −2.7 |
| Embodiment 3 | 11.2 | −1.8 |
| Prior Art 1 | 12.5 | −23.8 |
| Prior Art 2 | 20.9 | −8.6 |

The comparison between the first embodiment and prior art 1 as well as between second or third embodiment and prior art 2 distinctly tell that the metallized-film capacitor of the present invention has a smaller temperature rise. Deposited electrodes 110 and 210 in accordance with the first embodiment have fuses 7a, 7b as shown in FIG. 1, the therefore, the number of fuses working as heat generators are twice as many as those of prior art 1 and prior art 2 because the prior art have fuses 7a only on one face. However, the amount of current running through fuses 7a and 7b can be reduced to approx. a half of that of the prior art. Since the heat generated varies proportionately with the square of ripple current, the capacitor of the present invention generates less heat than the prior art does.

Next, the respective capacitors undergo a DC 1000 V with the ripple current running at 85° C., then measure a capacitance change in 1000 hours. Table 1 shows the result. The comparison between the first embodiment and prior art 1 as well as between second or third embodiment and prior art 2 distinctly tell that the metallized-film capacitor of the present invention has a smaller decrease in capacitance than that of prior art 2 in a high voltage environment, so that the capacitor of the present invention can be used in a higher voltage environment. To be more specific, the metallized-film capacitors of prior art 1 and prior art 2 encounter degradation in withstanding voltage of the dielectric film because of large amount of heat generated by ripple current, so that the many fuses blow out due to shorts in many local spots. On the other hand, the metallized-film capacitor used in the embodiments encounter fewer blows out of the fuses because the heat generated by a ripple current is suppressed.

EXEMPLARY EMBODIMENT 4

The fourth embodiment differs from the first one in an improvement of the pair of deposited electrodes. Similar elements to those in the first embodiment have the same reference marks, and only the different points between the fourth embodiment and the first one are demonstrated hereinafter.

Figure 7:
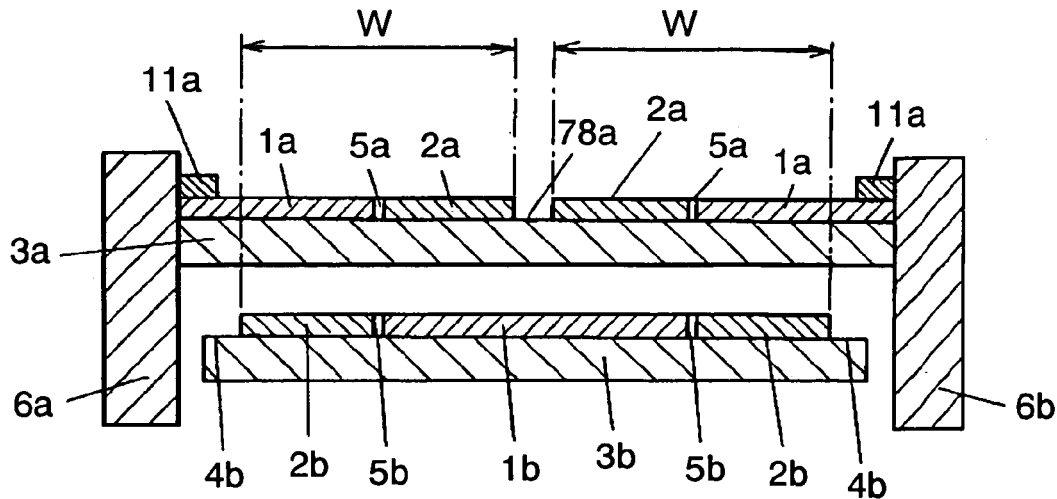
FIG. 7 shows a sectional view of a metallized-film capacitor in accordance with a fourth exemplary embodiment of the present invention.
Figure 8A:
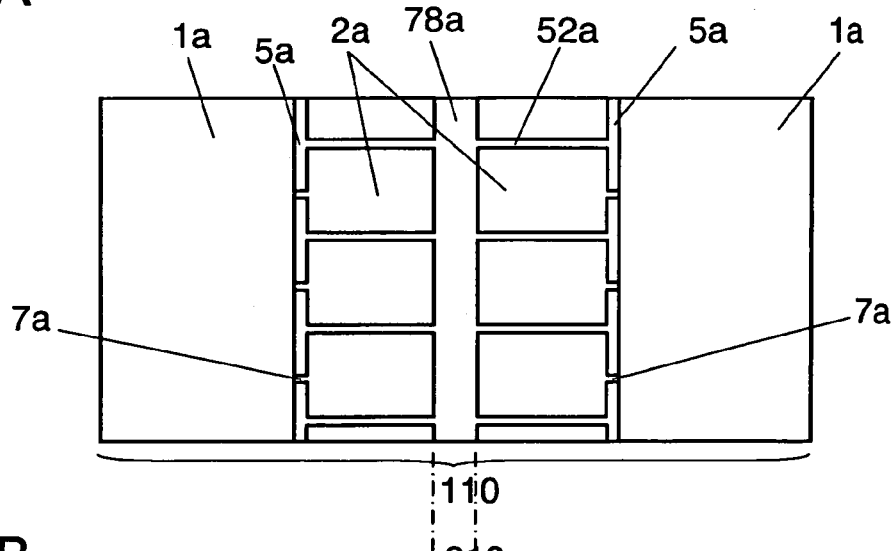
FIG. 8A shows a plan view of a first metallized-film in accordance with the fourth exemplary embodiment of the present invention.
Figure 8B:
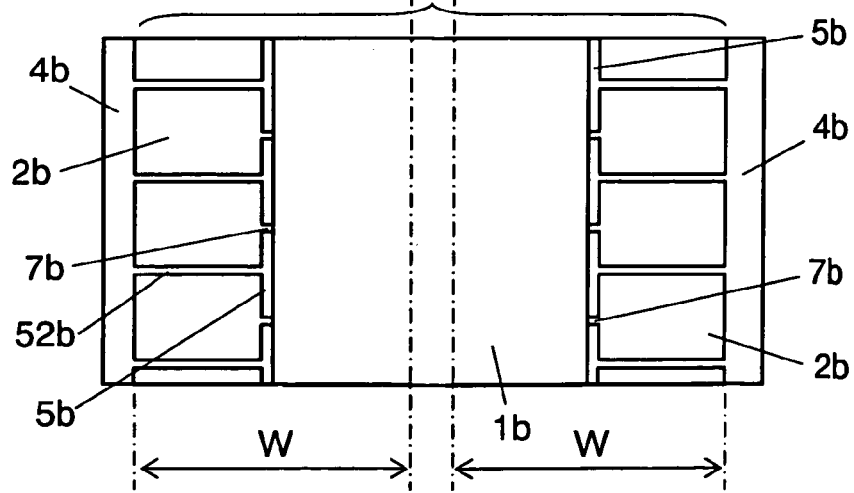
FIG. 8B shows a plan view of a second metallized-film in accordance with the fourth exemplary embodiment of the present invention.

As shown in FIG. 7, FIGS. 8A and 8B, deposited electrode 110 disposed on dielectric film 3a is separated by insulation margin 78a extending in a longitudinal direction of film 3a into plural sections having different voltages. Electrode 110 includes slit 5a at approx. center of the width (W) of the effective electrode. Plural divisional electrodes 2a, divided by slits 52a, exist in a place between the center and insulation margin 78a, and are coupled in parallel to non-divisional electrode 1a nearer to metallized contacts 6a, 6b via fuse 7a.

In a similar way, deposited electrode 210 disposed on dielectric film 3b includes insulation margins 4b extending in a longitudinal direction on both the ends, and slits 5b at approx. centers of the width (W) of respective effective electrodes. Plural divisional electrodes 2b divided by slits 52b exist in the places between the center and insulation margins 4b, and are coupled via fuses 7b in parallel to non-divisional electrode 1b disposed between divisional electrodes 2b placed at both the ends. Metallized contacts 6a, 6b are coupled to deposited electrode 110 at both the ends of first metallized-film 100.

The structure discussed above allows obtaining an advantage and an effect similar to those obtained in the first embodiment. Further, the two unit-capacitors separated at both sides by insulation margin 78a extending in a longitudinal direction of dielectric film 3a are coupled in series, so that the capacitor can be used in a higher voltage environment, and yet, it has a self-maintaining function, and generates less heat from fuses 7a.

EXEMPLARY EMBODIMENT 5

The fifth embodiment differs from the fourth one in a pair of deposited electrodes shaped in lattice-like divisional electrodes. Similar elements to those in the first embodiment have the same reference marks, and only the different points between the fifth embodiment and the fourth one are demonstrated hereinafter.

Figure 9:
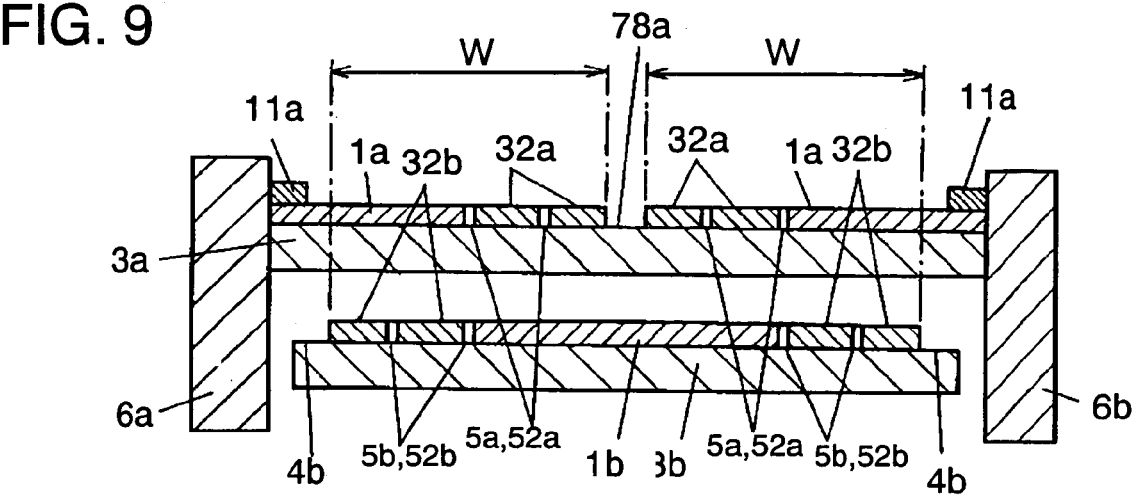
FIG. 9 shows a sectional view of a metallized-film capacitor in accordance with a fifth exemplary embodiment of the present invention.
Figure 10A:
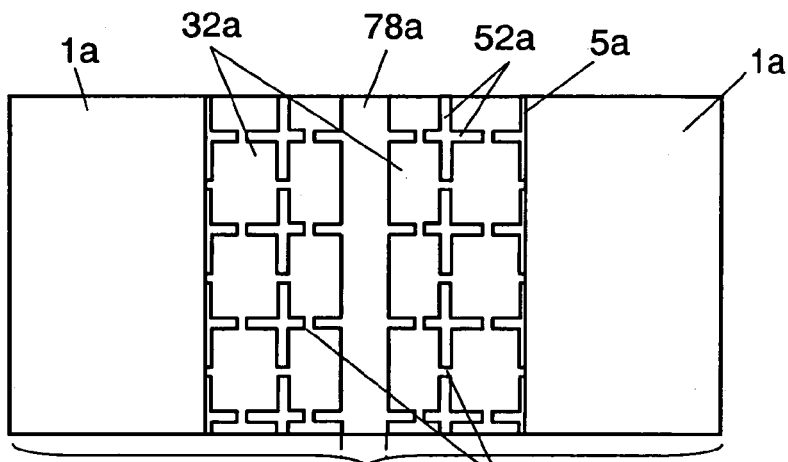
FIG. 10A shows a plan view of a first metallized-film in accordance with the fifth exemplary embodiment of the present invention.
Figure 10B:
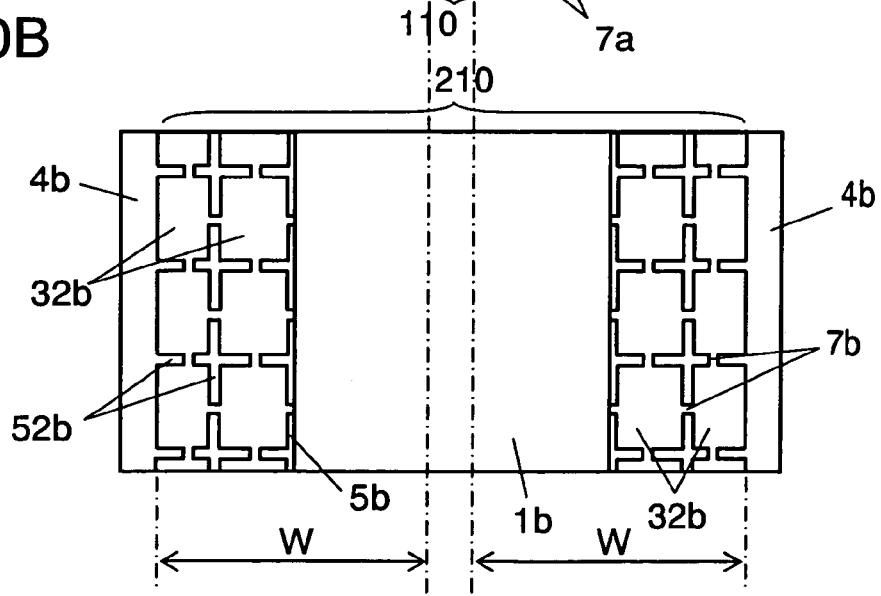
FIG. 10B shows a plan view of a second metallized-film in accordance with the fifth exemplary embodiment of the present invention.

As shown in FIG. 9, FIGS. 10A and 10B, deposited electrode 110 is separated by insulation margin 78a into plural sections having different voltages, and each one of the sections has slit 5a at approx. center of the width (W) of the effective electrode. Plural lattice-like divisional electrodes 32b divided by slits 52a exist between the respective centers and insulation margin 78a. In a similar way, deposited electrode 210 has slits 5b at approx. centers of respective sections. Plural divisional electrodes 32b divided by slits 52b exist between the respective centers and insulation margins 4b disposed both the ends of dielectric film 3b.

The foregoing structure allows achieving an advantage and an effect similar to those obtained in the first embodiment, and yet, two unit-capacitors are coupled together in series similar to the fourth embodiment, and further, heat generation from lattice-like divisional electrodes 32a can be suppressed. As a result, a metallized-film capacitor working in a higher voltage environment and generating less heat is obtainable.

Properties Evaluation 2

Properties of the metallized-film capacitor in accordance with the fourth and the fifth embodiment are described hereinafter. The capacitors used in those embodiments employ dielectric films 3a, 3b having deposited electrodes 110, 210 respectively, and each one of dielectric films 3a, 3b is formed this way: A winding and round-type capacitor element of 60 µF made from polypropylene film of 3.2 µm thickness is housed in a cylindrical container made of aluminum, and insulating oil is impregnated into the container. The effective electrode has a width (W) of 50 mm, and fuses 7a, 7b have a width of 0.4 mm. A conventional metallized-film capacitor is produced as prior art 3 for comparison. Those conventional one as prior art 3 uses same dielectric material and same dimensions: film thickness, capacitance, width (W) and width of fuses, as those discussed in the fourth and the fifth embodiments.

Prior Art 3

Figure 15:
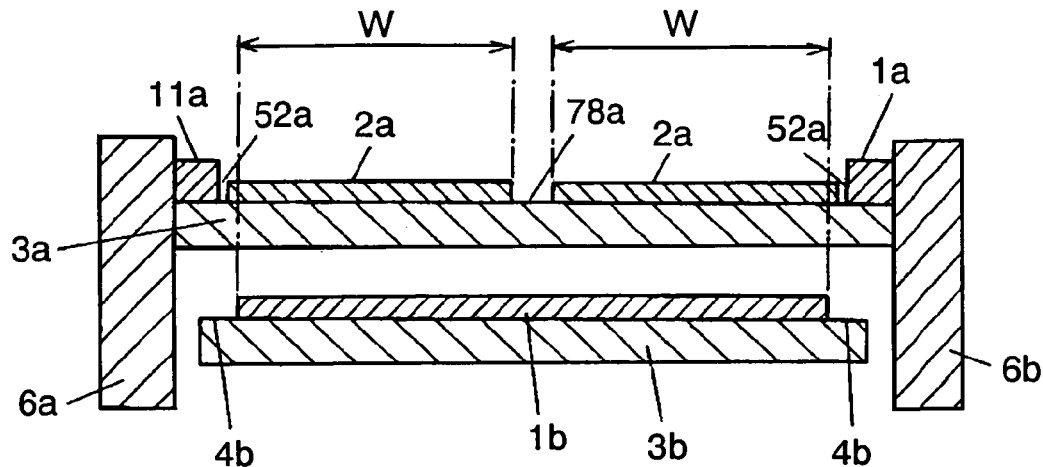
FIG. 15 shows a sectional view of a metallized-film capacitor in accordance with prior art 3.
Figure 16A:
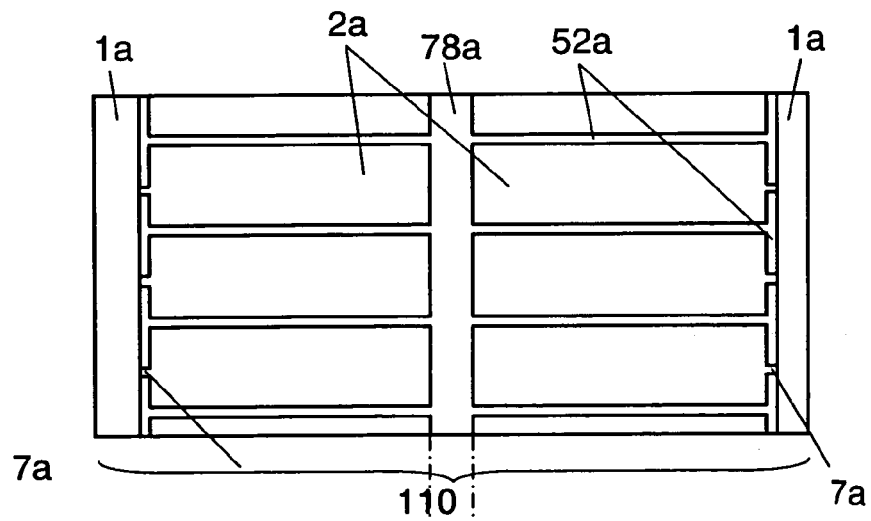
FIG. 16A shows a plan view of a first metallized-film in accordance with the prior art 3.
Figure 16B:
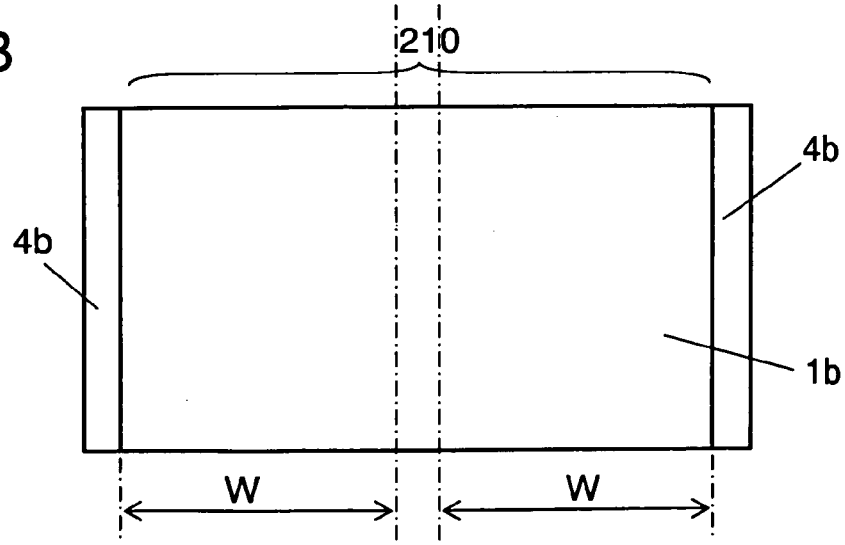
FIG. 16B shows a plan view of a second metallized-film in accordance with the prior art 3.

As shown in FIG. 15, FIGS. 16A and 16B, the metallized-film capacitor comprises dielectric film 3a including insulation margin 78a and divisional electrodes 2a across each one of the widths (W) of the effective electrodes, and dielectric film 3b including non-divisional electrode free of divisions on film 3b.

A sine-wave effective current of 15 A runs through those capacitors thus produced for 180 minutes at 10 kHz and 85° C. Then measure a temperature rise on the surface of the round-type capacitor elements. In 180 minutes of current running, the temperature rise is saturated in both of the capacitors. Next, the respective capacitors undergo a DC 1300 V with the ripple current running at 85° C., then measure a capacitance change in 1000 hours. Table 2 shows the result.

TABLE 2

|  | Temperature rise (° C.) | Capacitance change (%) |
| --- | --- | --- |
| Embodiment 4 | 6.1 | −4.3 |
| Embodiment 5 | 8.3 | −2.7 |
| Prior Art 3 | 13.4 | −13.4 |

The comparison between the fourth embodiment and prior art 3 distinctly tells that the metallized-film capacitor of the present invention shows a smaller temperature rise and a smaller decrease in capacitance than prior art 3 does. The capacitor having lattice-like divisional electrodes of the fifth embodiment can further reduce a decrease in capacitance.

The metallized-film capacitors in accordance with the first–the fifth embodiments can be used as a smoothing capacitor employed in an inverter controlling device which controls a rotation speed of an electric motor mounted in an electric car or a hybrid car. The hybrid car uses the electric motor as an electric car or uses a gasoline engine as an ordinary car depending on an occasion. Since the capacitor generates less heat from the fuses, and expects less decrease in capacitance, the capacitor is suited for cars used in a high temperature environment. In the fourth and the fifth embodiments, one insulation margin 78*a* is used; however, the present invention is not limited to one insulation margin.

In the embodiments previously discussed, divisional electrodes in four-sided figures are used as an example; however, the present invention is not limited to this figure. Other shapes, e.g. lattice-like electrodes of diamond shaped, hexagonal shaped or triangle shaped also produce a similar result to what is discussed previously. Fuses are placed on each side of the four-sided figure; however, they can be placed at the apexes instead of the sides.

An example, where a film includes slits 5*a*, 5*b* having the same dimensions along a longitudinal direction and a width direction, is shown in an embodiment; however, the width of the slits can be different from each other.

Polypropylene film is used as dielectric films 3*a*, 3*b*, 53*a*, and 53*b*; however, films made from other materials can achieve a similar result to what is discussed in the embodiments. Plural films overlaid one after another can be used as each one of dielectric films 3*a*, 3*b*, 53*a*, and 53*b* with a similar advantage. Other than the winding-type capacitor, which winds up each one of capacitor elements, such as a laminated capacitor which is formed by laminating metallized films can produce a similar advantage to what is discussed in the embodiments.

INDUSTRIAL APPLICABILITY

The present invention can provide an excellent metallized-film capacitor having a self-maintaining function, generating less heat from the fuses during the operation, and having less decrease in capacitance. The metallized-film capacitor of the present invention has the following advantages over the prior art: (1) it has a self-maintaining function and generates less heat from the fuses; (2) it can work at a higher voltage environment; (3) it obtains a higher withstanding voltage to ensure an operation in a higher voltage environment; (4) it has a pair of deposited electrodes formed through only one deposition step; and (5) it encounters less decrease in capacitance.

The metallized-film capacitor of the present invention can be employed as a smoothing capacitor because of the foregoing advantages, the smoothing capacitor has an advantage of less decrease in capacitance and is used in an inverter controlling device which controls a rotation speed of an electric motor. Further, this capacitor can be employed as a car-use capacitor in an inverter controlling device which controls a rotation speed of an electric motor, i.e. a driving source of a car.

The invention claimed is:

1. A metallized-film capacitor comprising:
    a dielectric film having a first film face and a second film face;
    a first deposited electrode covering the first film face;
    a second deposited electrode covering the second film face; and
    a first metallized contact and a second metallized contact disposed on both end-faces of the dielectric film,
    wherein the first deposited electrode includes:
        a first non-divisional electrode;
        a first divisional electrode separated by a first slit from the first non-divisional electrode, the first divisional electrode having substantially an identical thickness as the first non-divisional electrode;
        a first fuse for coupling the first divisional electrode to the first non-divisional electrode;
    wherein the second deposited electrode includes:
        a second non-divisional electrode;
        a second divisional electrode separated by a second slit from the second non-divisional electrode, the second divisional electrode having substantially an identical thickness as the second non-divisional electrode;
        a second fuse for coupling the second divisional electrode to the second non-divisional electrode;
    wherein the first non-divisional electrode overlaps the second divisional electrode, and the second non-divisional electrode overlaps the first divisional electrode.

2. The metallized-film capacitor of claim 1, wherein the first metallized contact is coupled to the first deposited electrode at a first end of the dielectric film, and the second metallized contact is coupled to the second deposited electrode at a second end of the dielectric film,
    the metallized-film capacitor further comprising:
        a first insulation margin occupying an end of the first film face and being adjacent to the second metallized contact; and
        a second insulation margin occupying an end of the second film face and being adjacent to the first metallized contact,
    wherein the first metallized contact is coupled to the first non-divisional electrode, and the second metallized contact is coupled to the second non-divisional electrode.

3. The metallized-film capacitor of claim 2, wherein the first slit and the second slit are located at a place where the slits overlap each other.

4. The metallized-film capacitor of claim 2, wherein the first slit is disposed in parallel to the first metallized contact, and the second slit is disposed in parallel to the second metallized contact,
    wherein the first slit and the second slit are placed at a center of an area where the first deposited electrode overlaps the second deposited electrode.

5. The metallized-film capacitor of claim 2, wherein a distance between the first metallized contact and the first slit is equal to or shorter than a distance between the first metallized contact and the second slit,
    wherein a distance between the second metallized contact and the second slit is equal to or shorter than a distance between the second metallized contact and the first slit.

6. The metallized-film capacitor of claim 2, wherein an entire face of the first non-divisional electrode overlaps the second divisional electrode, and an entire face of the second non-divisional electrode overlaps the first divisional electrode.

7. The metallized-film capacitor of claim 2, wherein at least one of the first divisional electrode and the second divisional electrode forms a lattice-like divisional electrode.

8. The metallized-film capacitor of claim 2, wherein the first non-divisional electrode includes a section having a thicker electrode film at a place coupled to the first metallized contact, or the second non-divisional electrode includes a section having a thicker electrode film at a place coupled to the second metallized contact.

9. The metallized-film capacitor of claim 2 further comprising another dielectric film, wherein the first deposited electrode is formed on the dielectric film, and the second deposited electrode is formed on the another dielectric film, and the dielectric film and the another dielectric film are laminated together.

10. The metallized-film capacitor of claim 2 further comprising another dielectric film, wherein the first deposited electrode is formed on the first film face of the dielectric film, and the second deposited electrode is formed on the second film face of the dielectric film, and the dielectric film and the another dielectric film are laminated together.

11. The metallized-film capacitor of claim 1, wherein at least one of the first deposited electrode and the second deposited electrode is separated by at least one insulation margin into plural sections having different voltages from each other, and plural unit-capacitors are coupled to each other in series.

12. The metallized-film capacitor of claim 11, wherein the first deposited electrode includes:
a third non-divisional electrode coupled to the first metallized contact;
a third divisional electrode separated by a third slit from the third non-divisional electrode;
a third fuse for coupling the third divisional electrode to the third non-divisional electrode;
a fourth divisional electrode coupled to the second metallized contact;
a fourth divisional electrode separated by a fourth slit from the fourth non-divisional electrode; and
a fourth fuse for coupling the fourth divisional electrode to the fourth non-divisional electrode,
wherein the third divisional electrode is disposed away from the fourth divisional electrode; and
wherein the third non-divisional electrode and the fourth non-divisional electrode overlap a divisional electrode of the second deposited electrode.

13. The metallized-film capacitor of claim 12, wherein the third divisional electrode is separated from the fourth divisional electrode by an insulation margin disposed at a center of the first deposited electrode.

14. The metallized-film capacitor of claim 12, wherein the second deposited electrode includes insulation margins adjacent respectively to the first metallized contact and the second metallized contact, and divisional electrodes adjacent to each one of the insulation margins.

15. The metallized-film capacitor of claim 12, wherein the capacitor includes a third slit at respective centers of the third non-divisional electrode and the first divisional electrode, and a fourth slit at respective centers of the fourth non-divisional electrode and the fourth divisional electrode.

16. The metallized-film capacitor of claim 12, wherein the third non-divisional electrode includes a section having a thicker electrode film at a place coupled to the first metallized contact, or the fourth non-divisional electrode includes a section having a thicker electrode film at a place coupled to the second metallized contact.

17. The metallized-film capacitor of claim 1 wherein the metallized-film capacitor is used as a smoothing capacitor employed in an inverter controlling device.

18. The metallized-film capacitor of claim 17, wherein the inverter controlling device controls a rotation speed of an electric motor mounted in a car.

19. The metallized-film capacitor of claim 11 wherein the metallized-film capacitor is used as a smoothing capacitor employed in an inverter controlling device.

20. The metallized-film capacitor of claim 19, wherein the inverter controlling device controls a rotation speed of an electric motor mounted in a car.

* * * * *